Patented May 15, 1951

2,553,515

UNITED STATES PATENT OFFICE 2,553,515

N-(p-ARSENOSO-BENZYL)-UREA

Herman Herbert Fox, Passaic, and Wilhelm Wenner, Montclair, N. J., assignors to Hoffmann-La Roche Inc., Nutley, N. J., a corporation of New Jersey No Drawing. Application December 11, 1948, Serial No. 64,901

1 Claim. (Cl. 260—440)

The present invention relates to a new organic arsenical and its method of preparation. More particularly the invention relates to a new arsenoxide of the following formula:

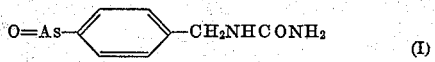
(I)

to which we have assigned the name N-(p-arsenoso-benzyl)-urea.

Organic arsenic compounds containing the arsenic in a trivalent state have useful therapeutic properties for the treatment of bacterial and protozoan diseases. The main disadvantage of the arsenoxides described in the literature is their instability in solution. As a result, solutions cannot be prepared and ampouled for subsequent use by the medical practitioner, but the dry arsenical must be supplied in one ampoule and distilled water in a second ampoule for on-the-spot preparation of the desired solution by the physician just prior to administration.

We have now found that the new arsenoso compound of Formula I has the desired chemotherapeutic activity and that furthermore it forms stable solutions, which can be ampouled and stored without decomposition for long periods of time. The new compound thus permits supplying the physician with an already prepared stable solution of an arsenical suitable for injection.

As the starting material for the preparation of our new compound we employ p-arsonoso-benzylamine (II) or its hydrochloride.

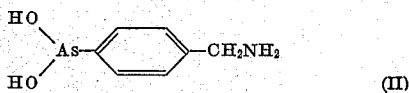
(II)

In general the new compound of Formula I, N-(p-arsenoso-benzyl)-urea, is obtained by reacting the free base or an acid addition salt of compound II with cyanic acid or an alkali metal cyanate. The conversion of the amine into the urea derivative by the interaction with cyanic acid is best carried out by using a stable salt of cyanic acid such as an alkali metal salt thereof instead of the unstable free cyanic acid, and liberating the latter in the reaction mixture by means of an acid, so that it reacts immediately with the amine.

It is therefore preferred to prepare our new compound by dissolving the N-(p-arsonoso)-benzylamine hydrochloride in dilute alkali, adding the resulting mixture to a solution of sodium or potassium cyanate, and acidifying the mixture. In this way the cyanic acid set free reacts smoothly with the amine with formation of the desired compound I. It is to be understood that variations of this procedure with regard to strength of alkali, solvent, concentration and temperature can be made within a wide range of conditions. The reaction can be carried out at room temperature.

The formed N-(p-arsenoso-benzyl)-urea precipitates slowly from the solution. It is insoluble in cold water. Solutions of the N-(p-arsenoso-benzyl)-urea in concentrations such as are required for therapeutic use can readily be prepared. As an example, a solution containing 10 mg. of the arsenical in 1 cc. is readily prepared with the help of a solubilizing agent such as ethylene glycol or propylene glycol.

Such solutions show exceptional stability. They remain unchanged for long periods of time when kept at room temperature. Solutions in ampoules showed no change in color and no precipitation after 41 days at 45° C. No change in activity or in toxicity could be observed after 500 hours at 45° C. The ampoule solution remained entirely clear and colorless even when prepared without any precautions such as exclusion of air.

Solutions of such exceptional stability offer great advantages for therapeutic purposes since they can be ampouled and supplied in a form ready for administration.

The following examples will serve to illustrate the invention.

Example 1

46 Grams of p-arsonoso-benzylamine hydrochloride are dissolved in 220 cc. of 2 normal sodium hydroxide (about 2½ equivalents) and mixed with a concentrated aqueous solution of 29.9 grams of potassium cyanate. The mixture is acidified with glacial acetic acid to pH 5-6. At first the addition of acetic acid causes a precipitate to form which dissolves completely when about 30 cc. of glacial acetic acid has been added. The reaction mixture is permitted to stand for about 15 minutes. It is then filtered from a small amount of a flocculent precipitate. On standing for 24-48 hours, the pure N-(p-arsenoso-benzyl)-urea precipitates out. It is filtered, washed with water and acetone, and dried. The compound is a colorless powder which is soluble in alkali and in hot water, insoluble in dilute hydrochloric acid and in most organic solvents. It does not melt below 300° C.

Example 2

1 Gram of N - (p - arsenoso - benzyl) - urea is suspended in 10 cc. of distilled water. Dilute sodium hydroxide is added dropwise until solution of effected. To this solution 50 cc. of propylene glycol is added. Then dilute acetic acid is added until the pH of the mixture is 7. The solution is made up to a volume of 100 cc. with distilled water and filtered. The resulting solution contains 1 gram of N-(p-arsenoso-benzyl)-urea in 100 cc. of 50 per cent propylene glycol. The solution remains clear on standing.

*Example 3*

If in the preparation of the solution as described in Example 2 ethylene glycol is substituted for propylene glycol, a stable 1 per cent solution of N-(p-arsenoso-benzyl)-urea in 50 per cent ethylene glycol is obtained.

We claim:

N-(p-arsenoso-benzyl)-urea.

HERMAN HERBERT FOX.
WILHELM WENNER.

REFERENCES CITED

The following references are of record in the file of this patent:

UNITED STATES PATENTS

| Number | Name | Date |
| --- | --- | --- |
| 1,280,122 | Jacobs | Sept. 24, 1918 |
| 1,835,433 | Schmidt | Dec. 8, 1931 |

FOREIGN PATENTS

| Number | Country | Date |
| --- | --- | --- |
| 553,301 | France | May 22, 1923 |

OTHER REFERENCES

Doak et al., J. Am. Soc., vol. 62, pp. 3010–3013 (1940).

Taylor and Baker, Sidgwick's Organic Chemistry of Nitrogen (1942), pp. 288–289.